United States Patent [19]
Fork

[11] 3,851,674
[45] Dec. 3, 1974

[54] SUPPLEMENTARY RACEWAY FOR AN UNDERFLOOR ELECTRICAL CABLE TRENCH

[75] Inventor: Frank W. Fork, Allison Park, Pa.

[73] Assignee: H. H. Robertson Company, Pittsburgh, Pa.

[22] Filed: Dec. 27, 1971

[21] Appl. No.: 212,499

[52] U.S. Cl................... 138/173, 138/111, 52/221, 52/221;222, 220/DIG. 25;3.94
[51] Int. Cl............................................. F16l 9/00
[58] Field of Search ............. 138/173, 92, 111, 116, 138/117, 115; 174/96

[56] References Cited
UNITED STATES PATENTS

| 643,743 | 2/1900 | Harris | 220/72 |
|---|---|---|---|
| 3,420,018 | 1/1969 | Fork | 52/221 |
| 3,494,651 | 2/1970 | Fork et al. | 138/92 |
| 3,721,051 | 3/1973 | Fork | 52/173 |

FOREIGN PATENTS OR APPLICATIONS
676,751   12/1963   Canada

Primary Examiner—William I. Price
Assistant Examiner—Steven M. Pollard
Attorney, Agent, or Firm—Harry B. Keck; George E. Manias

[57] ABSTRACT

A Supplementary Raceway adapted to be positioned beneath the cover plate and between the vertically adjustable side rails of an underfloor electrical cable trench, to provide a separate enclosed passageway. The supplementary raceway includes upstanding sides having upper edges disposed in supporting relation with the cover plate. The column strength of the opposite sides is enhanced by the provision of vertically presented corrugations.

6 Claims, 5 Drawing Figures

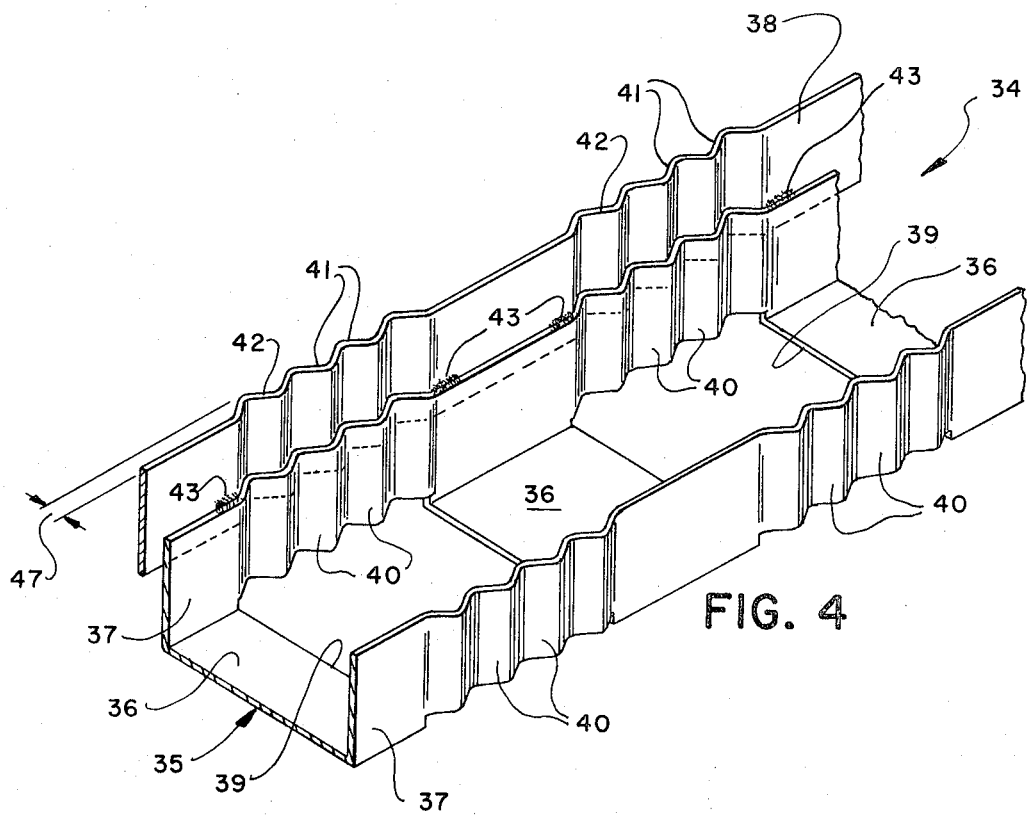
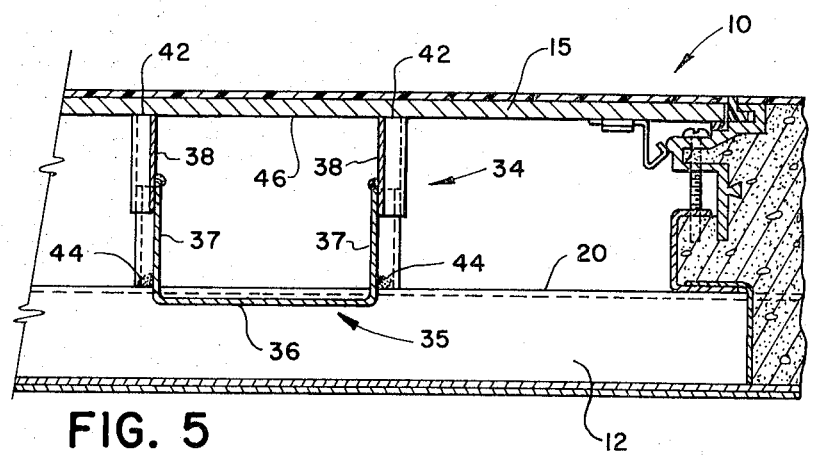

SUPPLEMENTARY RACEWAY FOR AN UNDERFLOOR ELECTRICAL CABLE TRENCH

BACKGROUND OF THE INVENTION

1. Field of the Invention:

This invention relates to a supplementary raceway for use in combination with an underfloor electrical cable trench, and more particularly to an improved supplementary raceway capable of supporting greater vertical loadings.

2. DESCRIPTION OF THE PRIOR ART:

The use of underfloor electrical cable trenches in combination with metal cellular flooring in modern buildings has become standard construction. The cable trench normally comprises opposite sides (normally vertically adjustable), each independently anchored in the concrete in fixed-apart relationship; and a plurality of end-to-end abutted cover plates spanning the distance between the opposite sides. The cover plates are presented flush with the upper surface of the concrete and are removable to provide access to the interior of the trench for adjustments in the electrical wiring carried thereby, throughout the life of the building. The prior art trenches also embody one or more discreet, normally vertically adjustable, internal partitions which divide the trench interior into one or more separate trench passageways. See U.S. Pats. No. 3,420,018 (FORK, Jan. 7, 1969); No. 3,435,568 (HOSEASON, et al, Apr. 1, 1969); No. 3,566,566 (JANIC, Mar. 2, 1971); and Canada Pat. No. 659,866 (FORK, Mar. 19, 1963). The several passageways provided by the partitions are adapted to segregate the wiring of different electrical services, such as, telephone, auxiliary signal or internal communications, high voltage power, and the like.

The expanding use of power, telephone and internal communications wiring in modern buildings, has produced a need for underfloor electrical cable trenches having increased wire carrying capacity. As the depth of the building floor is usually fixed, the increased wire carrying capacity is achieved by using a wider cable trench. The wider cover plate requires structural support to avoid undue cover plate deflection. The discreet, vertically adjustable partitions employed in prior art cable trenches fail to provide the required structural support.

SUMMARY OF THE INVENTION

The principal object of this invention is to provide an improved supplementary raceway which provides adequate support for the cover plate of an underfloor electrical cable trench.

A further object of this invention is to provide an improved supplementary raceway having opposite sides which are modified to increase their column strength and which are vertically adjustable.

The present invention provides improvements over that supplementary raceway described and claimed in copending applications Ser. No. 158,769, filed July 1, 1971, now U.S. Pat. No. 3,721,051, which is a continuation-in-part of copending application Ser. No. 71,494, filed Sept. 11, 1970 and now abandoned, both copending applications being assigned to the assignee of this invention. The supplementary raceway of the aforesaid U.S. Pat. No. 3,721,051, comprises a generally U-shaped channel having a bottom wall provided with longitudinally spaced-apart openings, and upstanding side walls provided along the opposite longitudinal edges of the bottom wall. A side plate is positioned adjacent to each of the upstanding side walls of the channel and is vertically adjustable relative to the upstanding side walls. Means, such as spot welds, are provided for securing the side plates to the upstanding side walls in vertically adjusted relation.

In accordance with one embodiment of the present invention, vertically presented corrugations are provided substantially throughout the entire length of each upstanding side wall. The side plates are provided with vertically presented corrugations which mate with the corrugations of the upstanding side walls whereby the side plates are vertically adjustable. The vertically presented corrugations enhance the column strength of the side plate/upstanding side wall combination.

In accordance with an alternative embodiment of this invention, each upstanding side wall and adjacent side plate are provided with longitudinally spaced-apart bands of vertically presented corrugations — each band occurring in that region of the side wall adjacent to each bottom wall opening. In the region between the bottom wall openings, the upstanding side walls and the side plates remain uncorrugated.

BRIEF DESCRIPTION OF THE DRAWINGS

FIG. 4 is a fragmentary isometric view similar to FIG. 3, illustrating an alternative embodiment of the present supplementary raceway; and FIG. 5 is a fragmentary cross-sectional view, similar to FIG. 2, illustrating the supplementary raceway of FIG. 4 installed in the trench-forming sub-assembly of FIG. 1.

BRIEF DESCRIPTION OF THE PREFERRED EMBODIMENT(S)

Figure 1:
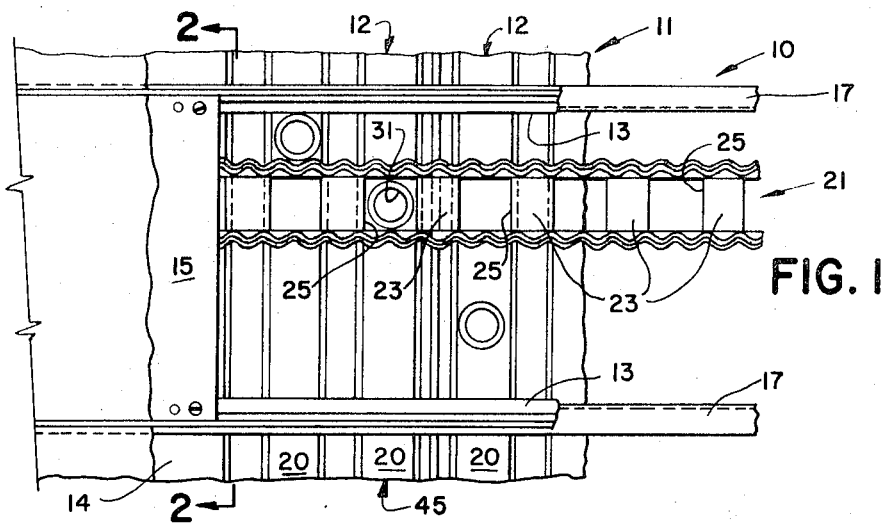
FIG. 1 is a fragmentary plan view of a trench-forming subassembly installed over metal cellular units and embodying the supplementary raceway of this invention.
Figure 2:
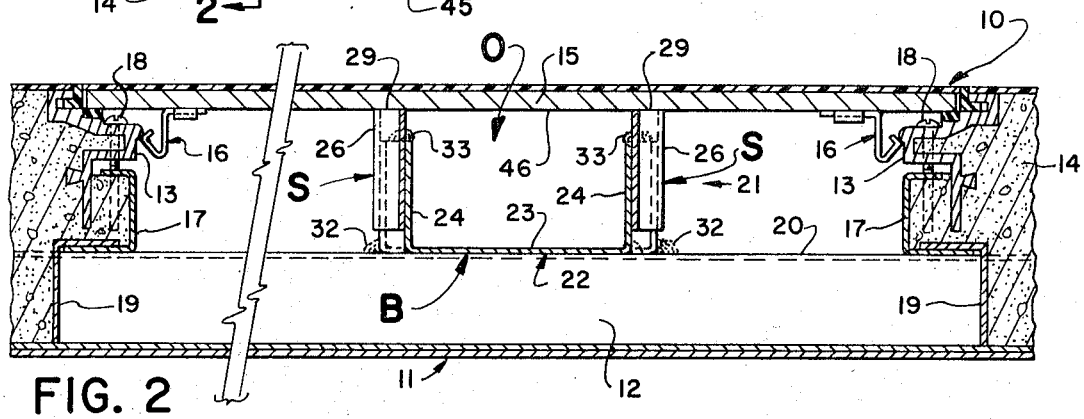
FIG. 2 is a cross-sectional view taken along the line 2—2 of FIG. 1.

FIGS. 1 and 2 illustrate a trench-forming sub-assembly 10 installed over a subfloor 11 which is assembled from plural metal cellular units 12. For a complete description of the trench-forming sub-assembly 10, reference is directed to the aforesaid U.S. Pat. No. 3,721,051. For the purposes of the present invention, it is believed sufficient to state that the trench-forming sub-assembly 10 includes a pair of vertically adjustable side rails 13, each of which is independently anchored in a layer of concrete 14 in fixed spaced-apart relationship. End-to-end abutted cover plates 15 (only one visible) span the distance between the side rails 13 and are essentially flushed with the upper surface of the concrete 14. Fastener means 16 is provided for detachably connecting the cover plate 15 to the side rails 13, thereby to provide ready access to the interior of the trench-forming sub-assembly 10. A sub-rail 17 is positioned beneath each of the side rails 13. Each of the sub-rails 17 overlies the coplanar crests 20 of the metal cellular flooring 11. Leveling screws 18 (FIG. 2) provide vertical adjustment of the position of the side rails 13 relative to the metal cellular units 12. Closure means, such as angle-like members 19, one positioned along each of the sub-rails 17, is provided for inhibiting ingress of the concrete 14 into the interior of the trench-forming sub-assembly 10. It will be appreciated by inspection of the FIGS. 1 and 2 that the sub-assembly 10 does not embody a conventional U-shaped base pan. Consequently, the overall width of the trench may be increased as desired to provide a trench having the desired wire carrying capacity.

The present invention provides vertically adjustable conduit means in the form of a supplementary raceway 21 (FIGS. 1 and 2). In general, the supplementary raceway 21 comprises a bottom wall B overlying the crests 20 of the metal cellular units 12, opposite sides S extending upwardly from the bottom wall B into supporting engagement with the cover plate 15, and an open top 0 which is capped by the cover plate 15.

Figure 3:
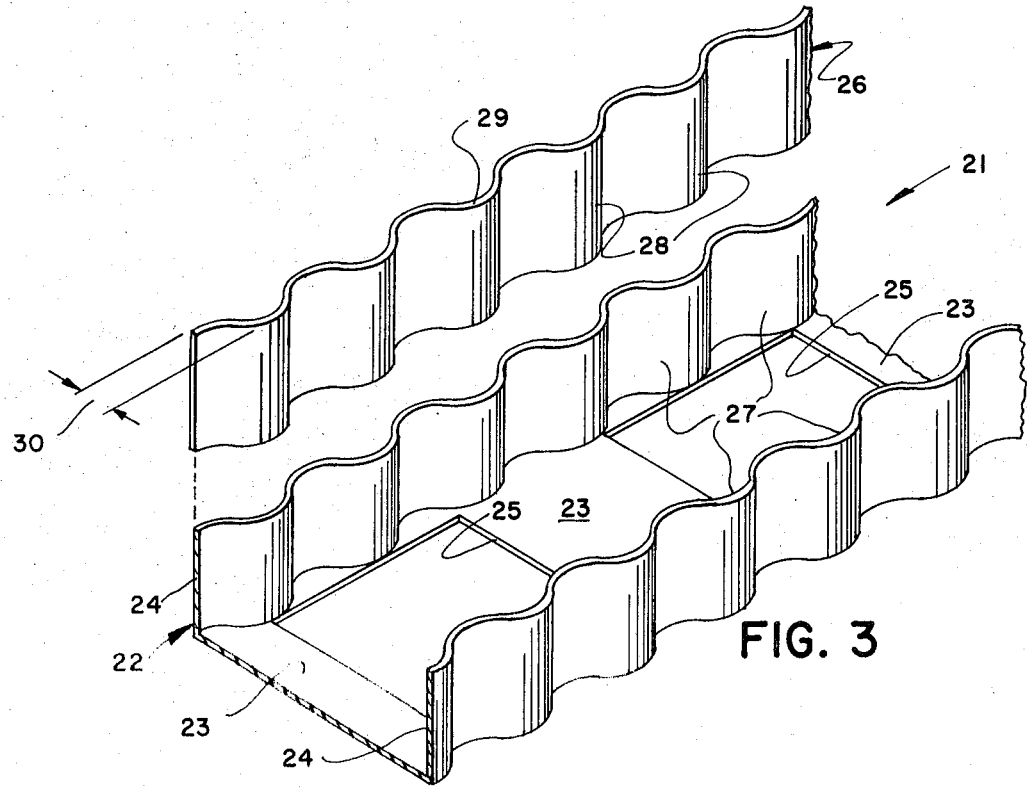
FIG. 3 is a fragmentary isometric view illustrating two of the three parts of the supplementary raceway of this invention.

The supplementary raceway 21 (FIG. 3) comprises a generally U-shaped channel 22 including transverse strips 23 adjoining upstanding side walls 24. The transverse strips 23 are longitudinally spaced-apart to provide generally rectangular openings 25. The supplementary raceway 21 additionally includes side plates 26 (only one illustrated), one adjacent to each of the upstanding side walls 24.

In accordance with the present invention, each of the upstanding side walls 24 is provided with vertically presented corrugations 27 throughout substantially its entire length. The corrugations 27 preferably are positioned externally of the periphery of the openings 25. Each of the side plates 26 is formed from a generally rectangular strip of sheet metal and is provided with mating, vertically presented corrugations 28. The side plates 26 present sinuous upper edges 29 each having an overall width indicated at 30. The width 30 preferably is one-half inch or greater, thereby to provide an adequate area of contact with the cover plate 15 (FIG. 2).

When the supplementary raceway 21 is installed over the metal cellular units 12 (FIG. 1), each of the transverse strips 23 spans the distance between adjacent ones of the crest 20, whereby portions of the crest 20 are visible at the openings 25. A grommeted opening 31 is provided in selected ones of the crest 20 at the openings 25. The grommeted opening 31 provides communication between the interior of the raceway 21 and the subjacent cell 45 (FIG. 1) of the metal cellular unit 12. The generally U-shaped channel 22 is secured to the crest 20, for example, by welds 32. Each of the side plates 26 is secured to the adjacent upstanding side wall 24, for example, by welds 33. It will be observed in FIG. 2 that the sinuous upper edge 29 of the side plates 26 engage the bottom surface 46 of the cover plate 15. Inasmuch as the mating, vertically presented corrugations 27, 28 (FIG. 3) enhance the column strength of the now united upstanding side wall 24 and side plate 26, more than adequate structural support is provided for the cover plate 15. It should be evident that the mating, vertically presented corrugations 27, 28 (FIG. 3) do not interfere with the vertical adjustment in the position of the side plates 26 relative to the U-shaped channel 22.

An alternative embodiment of the present supplementary raceway is illustrated in FIGS. 4 and 5 and is designated generally by the numeral 34. The raceway 34 comprises a generally U-shaped channel 35 including transverse strips 36 adjoining upstanding side walls 37. The supplementary raceway 34 additionally includes side plates 38 (only one illustrated), one adjacent to and overlapping each of the upstanding side walls 37. The transverse strips 36 are longitudinally spaced-apart to provide generally rectangular openings 39.

In this embodiment, the longitudinal width of each of the transverse strips 36 is less than the distance between adjacent ones of the coplanar crests 20 (FIG. 1). Thus, when the raceway 34 is installed (FIG. 5) each of the transverse strips 36 is positioned in the region between adjacent coplanar crests 20 and below the level of the coplanar crests 20. With this arrangement, wires passing through the supplementary raceway 34 and over the crests 20 will not come into contact with the edges of the transverse strips 36.

In this embodiment, each of the upstanding side walls 37 and each of the side plates 28 is provided with longitudinally spaced-apart bands of mating, vertically presented corrugations 40, 41, respectively. Each band of corrugations 40, 41 is provided in those regions of the side walls 37 and side plate 28 adjacent to the generally rectangular openings 39. In the region between the generally rectangular openings 39, the upstanding side walls 37 and the side plates 38 remain uncorrugated. Each of the side plates 38 is formed from a generally rectangular strip of sheet metal and presents a sinuous upper edges 42 having an overall width indicated at 47. As shown in FIG. 4, each of the side plates 38 is secured, for example by welds 43, to the adjacent upstanding side wall 37 in vertically adjusted relation.

When the supplementary raceway 34 is installed (FIG. 5) the generally U-shaped channel 35 is secured to the crests 20, for example, by welds 44. The sinuous upper edges 42 of the side plates 38 engage the bottom face 46 of the cover plate 15 and provide structural support therefore.

The channels 22, 35 and the side plates 26, 38 of the raceways 21, 34 may be formed from light guage metal sheets and in convenient lengths, for example 10 to 20 feet.

I claim:

1. In a supplementary raceway having a generally U-shaped configuration including a bottom wall provided with longitudinally spaced-apart openings and upstanding side walls integrally formed along the opposite longitudinal edges of said bottom wall, the improvement comprising:

said upstanding side walls having vertically presented corrugations which enhance the column strength of the said side walls, said side walls presenting sinuous upper edges;

side plates, one adjacent to each of said upstanding side walls and adjustable relative thereto, each of said side plates being provided with vertically presented corrugations mating with the said corrugations of said side walls; and means for securing each of said side plates to the adjacent upstanding side wall in vertically adjusted relation.

2. In a supplementary raceway having a generally U-shaped configuration including a bottom wall provided with longitudinally spaced-apart openings and upstanding side walls integrally formed along the opposite longitudinal edges of said bottom wall, the improvement comprising:

said upstanding side walls having vertically presented corrugations which enhance the column strength of the said side walls, said side walls presenting sinuous upper edges; said vertically presented corrugations being provided only in those regions of said upstanding side walls adjacent to the said openings in said bottom wall.

3. The supplementary raceway of claim 2 including side plates, one adjacent to each of said upstanding side walls and vertically adjustable relative thereto, each of said side plates including vertically presented corrugations mating with the corrugations of said upstanding side walls; and means for securing each of said side plates to the adjacent upstanding side wall in vertically adjusted relation.

4. In an underfloor electrical cable trench including a pair of vertically adjustable side rails maintained in fixed spaced-apart relationship, a cover spanning the distance between and supported by said side rails; and a supplementary raceway disposed beneath said cover plate and between said side rails, said raceway having a generally U-shaped configuration including a bottom wall having longitudinally spaced-apart openings provided therein and opposite upstanding sides integral with said bottom wall, the improvement comprising:

said opposite upstanding sides having vertically presented corrugations and sinuous upper edges disposed in supporting relation with said cover plate;

said opposite sides of said supplementary raceway comprising:

upstanding side walls presented along the opposite longitudinal edges of said bottom wall and provided with the said vertically presented corrugations;

side plates, one overlapping each of said upstanding side walls and being provided with vertically presented corrugations mating with the corrugations of said upstanding side walls; and means for securing each of said side plates to the adjacent upstanding side wall in vertically adjusted relation with the upper edges thereof disposed in supporting relation with said cover plate.

5. In an underfloor electrical cable trench including a pair of vertically adjustable side rails maintained in fixed spaced-apart relationship, a cover spanning the distance between and supported by said side rails, and a supplementary raceway disposed beneath said cover plate and between said side rails, said raceway having a generally U-shaped configuration including a bottom wall having longitudinally spaced-apart openings provided therein and opposite upstanding sides integral with said bottom wall, the improvement comprising:

said opposite upstanding sides having vertically presented corrugations provided only in those regions of said opposite upstanding sides adjacent to the said openings in said bottom wall and sinuous upper edges disposed in supporting relation with said cover plate.

6. The improvement of claim 4 wherein the said vertically presented corrugations are provided in those regions of said upstanding sidewalls and of said side plates adjacent to the said openings in said bottom wall.

* * * * *